United States Patent Office 2,932,217
Patented Apr. 12, 1960

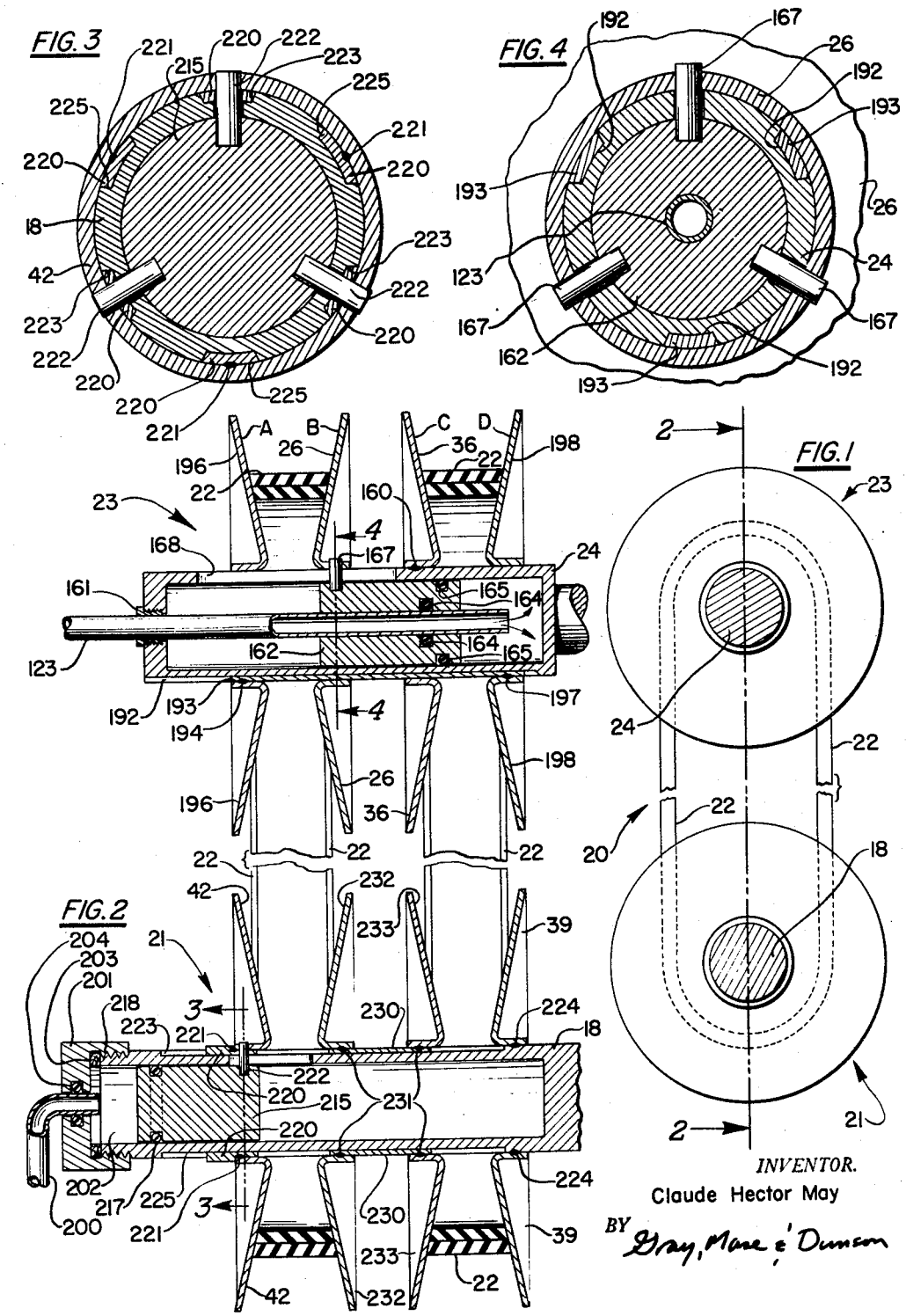

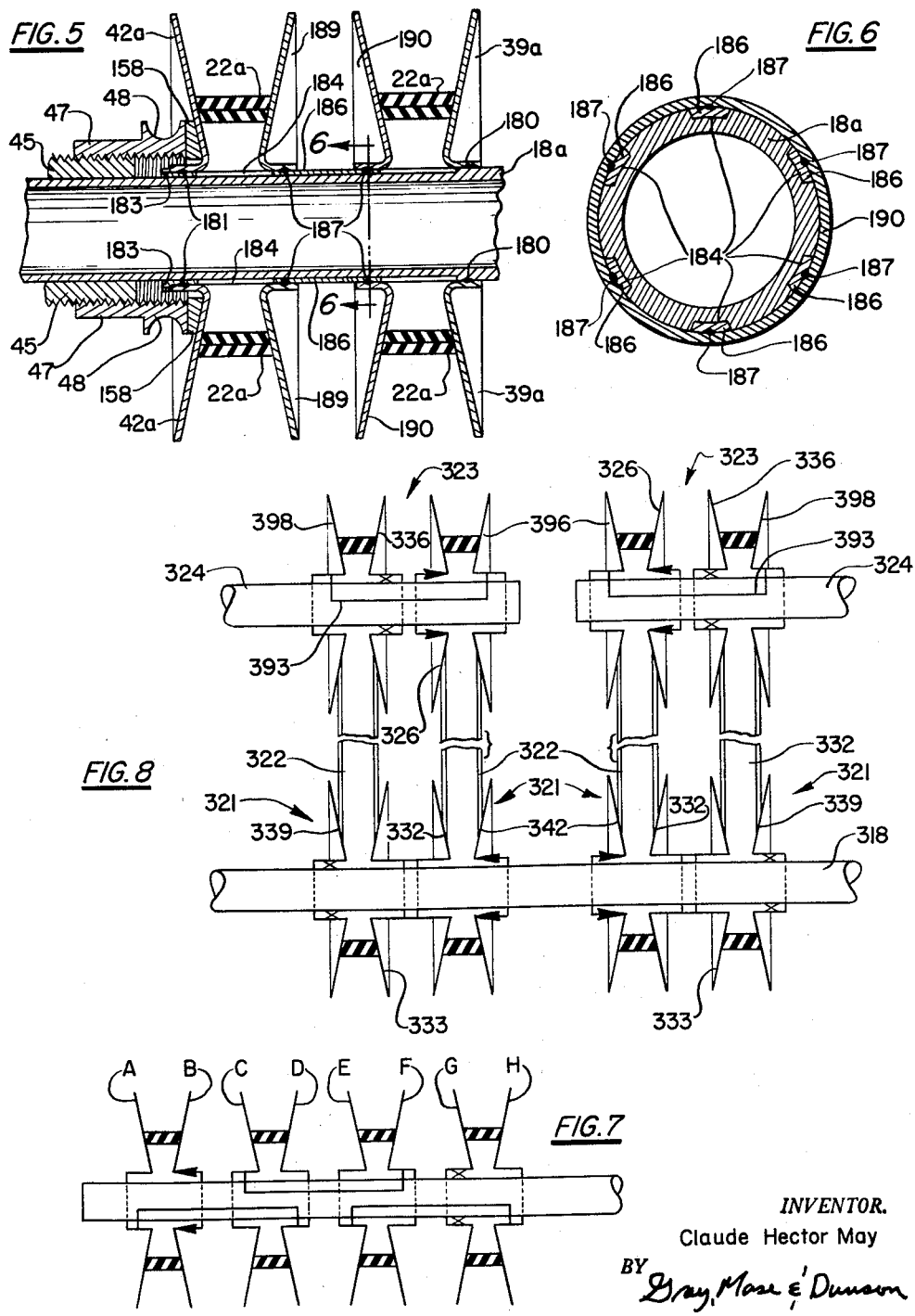

2,932,217

POWER TRANSMISSION

Claude Hector May, Columbus, Ohio

Application June 7, 1956, Serial No. 589,909

9 Claims. (Cl. 74—710)

This invention relates to power transmission and, more particularly, to pulley construction and flange arrangements in belt or flexible coupling drive power transmission aparatus. This invention is particularly useful in variable speed V-belt transmissions having a plurality of belts.

As described in patent application Serial No. 216,183, filed March 17, 1951, now Patent 2,754,691, of which this is a continuation-in-part, in multiple belt power transmission it is very important to control the tension in the plurality of belts so that the belts are equally loaded and tension is substantially the same in each belt. In adidtion, it is important in belt drives to maintain correct belt alignment at all speeds in all power transmission ratios. This is particularly critical in closely coupled belt drives having a relatively short distance between centers of the driving and driven shafts.

Briefly, this invention comprises an arrangement of pulley-flange couplings and interconnections in conjunction with driving and driven shafts wherein the flanges, with the exception of two flanges in all pulley groups, are free to move axially, and to position themselves so that each of the several belts in the drive operate at substantially equal tension and loading.

In the past when two or more belts have been used to drive one device from one source, it has been customary to use very close tolerances on the pulley-groove dimensions and to use matched belts. Even with such extreme care, however, the mechanical efficiency of a multiple belt drive has been invariably lower than that of a single belt drive, because of remaining inaccuracies in manufacture of the component parts. This invention comprises an apparatus whereby more than one belt may be used to drive a device, and the arrangement of the sliding flared flanges is such that there is complete balance of loads between the belts.

While in some multiple belt, power transmission installations the belts are only lightly loaded with respect to their design capacity, and therefore alignment of the several belts and variation in tension among the several belts does not cause undue difficulty, such installations are inefficient from an original cost and excess drive friction standpoint. In installations in which the belts are heavily loaded at or near the design capacity of the belts, factors such as belt alignment, equal tensions and loading between the several belts of the belt drive become very important.

It is thus an object of this invention to provide a multiple-V-belt power transmission apparatus wherein the loads transmited by the belts are equally distributed and are self-distributing. It is a further object to provide a multibelt power transmission apparatus which is self-adjusting in accordance with the variations in commerically manufactured belts to provide even loading and tension among the several belts.

It is an object of this invention to provide a multibelt power transmission apparatus adapted to be shifted and varied with respect to speed and power ratios without variation in belt alignment. It is another object to provide multibelt power transmission aparatus in which the speed and power transmission ratio may be conveniently varied by changing the distance between flared flanges of the pulleys of the apparatus without changing the alignment of the several belts, and at the same time maintaining the balance of tension and load existing between the several belts of the apparatus.

Another purpose of this invention is to provide multibelt power transmission aparatus having a differential drive effect between each of a plurality of power output sources. It is a purpose to provide this differential effect in a construction that provides proportional torque to output sources that rotate at different speeds.

To these and other ends, this invention comprises apparatus, a preferred form of which is disclosed in the following description and attached drawings.

In the drawings:

Fig. 1 is an elevation view, partially schematic, illustrating the transmission of power in a multibelt arrangement according to this invention;

Fig. 2 is a longitudinal section view taken along the line 2—2 of Fig. 1, showing pulleys on a driving shaft and pulleys on a driven shaft, connected by two V belts according to this invention;

Fig. 3 is a sectional view taken on the line 3—3 of Fig. 2;

Fig. 4 is a sectional view taken on the line 4—4 of Fig. 2;

Fig. 5 is a longitudinal sectional view showing a multibelt arrangement of a plurality of pulleys operated by different means;

Fig. 6 is a sectional view taken on the line 6—6 of Fig. 5;

Fig. 7 is an elevational view showing a schematic arrangement of a multibelt drive having a number of pulleys greater than two; and Fig. 8 is a plan or elevational view showing a schematic arrangement of a multibelt drive wherein separate driven units are provided with power from a single driving unit.

Referring to Fig. 1, multibelt power transmission apparatus, designated generally as 20, comprises driving pulleys 21—21 associated with driving shaft 18; driven pulleys 23—23 associated with driven shaft 24; and belts 22—22.

The designation of shaft 18 and pulleys 21—21 as "driving" and the shaft 24 and pulleys 23—23 as "driven" is established as a matter of descriptive convenience only. It should be recognized that in a drive of this type, either shaft may be the driving shaft and either shaft may be the driven shaft, and thus the functions are reversible.

Referring to Figs. 2 and 3 with particularity, a double pulley is shown wherein flared or coned flange 39 is fixedly attached to shaft 18 by means of welded or brazed joint 224. Shaft 18 is hollow and positioned therein is piston 215. O-ring 217 is provided as a seal, and a fluid such as oil is brought in through pipe 200 into chamber 202 enclosed by flange cap 201, which is threaded on to the shaft 18 by means of threads 218. Sealing for chamber 202 is provided by packing 203 and suitable seal or O ring 204.

Connected to piston 215, by means of pins 222—222, is sliding flared flange 42 connected to splines 220—220 by means of welded or brazed joints 221—221. Splines 220—220 are adapted to slide in slots 223—223 and similar slots 225—225. Adapted to slide in the same slots 223—223 and in the similar slots 225—225 are splines 230—230, at each end of which there are securely fastened by means of welded or brazed joints 231—231, flared flanges 232 and 233. Positioned between respective flanges 42 and 232 and between flanges 233 and 39 are belts 22—22.

During rotation of pulleys 21—21 an increase in fluid pressure within shaft 18 causes piston 215 to move to the right thereby moving flange 42 correspondingly. Such movement of flange 42 is resisted by the adjacent belt 22, the subassembly 232—230—233, and the other belt 22 which abuts fixed flange 39. Thus, any such movement can be accomplished only by forcing one or both of the belts radially outwardly toward the peripheries of the pulley flanges; and such belt movement will occur to a degree dependent upon belt tension. Since the subassembly 232—230—233 is axially slidably mounted on the shaft 18, it will assume, upon such movement of flange 42, such a position between that flange and the fixed flange 39 as will correspond to equal tensions in the two belts 22—22.

Movement of the belts 22—22 outward toward the periphery of the pulley flanges increases the linear speed of the belts increasing the speed ratio of the drive. On the other hand, if during rotation of pulleys 21—21 the fluid pressure within shaft 18 is decreased, the tension in the belts will cause the belts to move toward the axis of the pulleys 21—21 and the space between pulley flanges 42 and 232 and between flanges 233 and 39 will be increased. Movement of the belts 22—22 toward the axis of the pulleys causes the linear speed of the belts to decrease and the speed ratio to decrease also.

The net results of the flange arrangement above described is to enable both belts 22—22 always to run at the same tension. While running at the same tension they both transmit equal amounts of power and therefore both must be at the same power ratio. It does not, in fact, matter if the two belts are not equal in length or width, they still run at the same ratio and transmit the power equally. It will be seen that should one belt not be transmitting one-half of the power, but some lesser amount, then its tension would be less than the other belt. This lower tension would immediately result in a lower thrust on the corresponding sliding flange pair 232, 233. However, since the flange pair 232, 233 is free to slide axially, it would be impossible to maintain this unbalanced equilibrium and the flange pair would move toward the belt having the lower tension to equalize the tension in the two belts. Therefore, unless the two belts are exactly matched, they will not of necessity ride at the same radius in their respective pulleys. This system eliminates the loss of efficiency resulting from the action of pairs of belts in conventional arrangements.

It is apparent that more than two belts could be used in a multibelt power transmission having pulleys on one shaft arranged in the manner of pulleys 21—21. In such an arrangement similar intermediate flange units such as the subassembly comprising flanges 232, 233, and splines 230—230 would be interposed between the fixed flange 39 and the movable flange 42. Such additional intermediate flange units would in a similar manner be adapted to move axially under pressure of the belts between belts resting on the convergent conical flanges. Such adjusting movement between the various flanges would provide for balanced uniform tensions and loading in the various belts.

In some applications, it is believed that only one flange of each opposed-conical-pulley set need be rotatably fixed relative to shaft 18. Thus, while the splines 230—230 are shown as interposed in grooves, such rotation prevention as provided by the grooves and splines 230 would not be necessary in some applications as the friction of the belts against one rotatably fixed flange in each pulley would be sufficient to drive and transmit power.

Referring to the "driven" pulleys 23—23 on which the belts 22—22 rotate, it will be seen that the shaft 24 is similar to shaft 18, in that it is provided with a fluid inlet pipe 123. A bearing 161 is provided to facilitate the rotation of shaft 24 about the fluid pipe 123. Slidably positioned inside hollow shaft 24 is a piston 162, equipped with pins 167—167, which engage flared flange 26. Piston 162 is provided with sealing O rings 164, 165, and an increase in fluid pressure in pipe 123 causes movement of piston 162 in a left-hand direction. This movement occurs by reason of the admission of fluid through pipe 123 into the chamber behind and to the right of the piston 162. The piston 162 slides on the pipe 123 and within the cylinder of shaft 24. Pin 167 slides in slot 168. Flared flange 36 is fixedly secured to shaft 24 by means of a resistance-welded joint or brazed joint 160. However, there are also provided slots 192—192 in each of which slides one of splines 193—193. Fixedly attached to splines 193 by welded or brazed joints 194—194 is flared pulley flange 196 and at the other end of splines 193, and fixedly secured thereto by welded or brazed joints 197—197, is flared flange 198. Positioned between these flanges are belts 22—22.

During the rotation of pulleys 23—23, an increase in fluid pressure in line 123 causes piston 162 to move in a left-hand direction. Movement of piston 162 in a left-hand direction through pins 167 causes flange 26 to move in the same direction, and through belt 22, causes flange 196 also to move in a left-hand direction. Since flange 198 is connected to the same splines to which flange 196 is connected, flange 198 also will tend to move in a left-hand direction. Flange 36, however, remains fixed. Movement in this direction of these flanges will cause belts 22—22 to be urged toward the outer periphery of pulleys 23—23, which will decrease the speed and gear ratio.

However, in the normal operation of a multibelt power transmission, when the flanges of the driving pulleys 21—21 are urged closer together to increase the speed ratio of the drive, the flanges of the driven pulleys 23—23 will be allowed to move farther apart by means of a decrease in the fluid pressure against piston 162 of the driven pulleys 23. When the fluid pressure against the piston 162 is decreased simultaneously with the increase in fluid pressure against piston 215 in shaft 18, the tension in the belts 22—22 will cause the distance between flanges 196 and 26 and between flanges 36 and 198 to be increased, allowing the belts 22—22 to move inward toward the axis of the pulley 23.

It will be apparent that the same method of load balancing as described in the two-belt arrangement for "driven" pulleys 23—23 may be employed with three or more belts.

Considering the two-belt arrangement of Figs. 2 and 4, and reading from the left, flange A is coupled to flange D; flange B is the one receiving thrust from the piston within the shaft; and flange C is the fixed flange.

Then in a three-belt arrangement made with a three-pulley group as imagined from a modification of driven pulleys 23—23 in Figs. 2 and 4, the same lettering holds true. The second from the left B is always the thrust flange, and the second from the right E is always the fixed flange. A would always be coupled to D, and C to F, etc. (See Fig. 7.)

In a four-belt arrangement the same coupling as above would be used, i.e., second from the left B taking the thrust, second from the right G fixed, A coupled to D, C coupled to F, and E coupled to H. Such an arrangement is shown diagrammatically in Fig. 7.

Referring again to Fig. 2, it is a particularly important feature of the combination of driving pulleys 21—21 disclosed, and driven pulleys 23—23 disclosed, that as the movable flanges shift axially and readjust to equal belt tension with changes in speed ratio, the alignment of belts 22—22 remains substantially the same. Thus, during a shift to a lower speed ratio, the belts 22—22 will move in closer to the axis of shaft 18, as the distance between opposed coacting belt flanges increases in pulleys 21—21. Since flange 39 is fixed and flanges 233, 232 and 42 will move to the left, the center line of belts 22 will move to the left also. The center line of the right-hand belt 22 will move to the left one-half of the increase in distance between the flanges 39 and 233. The center line of the left-hand belt 22 will move to the left a distance equal to the full increase in width between flanges 39 and 233, and between flanges 232 and 42.

In such a change to a low speed ratio as presently under consideration, it is necessary that the flanges 196, 26, 36, and 198 of pulleys 23—23 become closer together, accompanied by a shift to the left of belts 22—22. This shift to the left should be equal to the movement of the center lines of the belts 22—22 produced in pulleys 21—21. The arrangement of sliding, fixed, and thrust flange connections as herein disclosed for pulleys 23—23 provides this equal belt center-line shift at both ends of the drive combination.

It will be seen that since flange 36 is the fixed flange among pulleys 23—23, an increase in fluid pressure in pipe 123 will force flange 26 to move to the left causing the left-hand belt 22 to travel outward between the flanges 26 and 196 toward the periphery thereof. The outward travel between flanges 26 and 96 moves the center line of left-hand belt 22 to the left with respect to flange 196. The movement of flange 196 to the left also moves flange 198 to the left causing the right-hand belt 22 to move to the left accompanied by travel outward toward the periphery of the flanges.

Accordingly, by reason of the above-described movement of flanges 26, 196, and 198 the center line of the right-hand belt 22 will move to the left one-half of the decrease in distance between flanges 36 and 198. This move then matches the movement of the same belt 22 on the pulley 21 over which the belt 22 travels. In a like manner, the center line of the left-hand belt 22 will move to the left a distance equal to the full decrease in width between flanges 196 and 26, and between flanges 36 and 198. This move matches the movement of the same belt 22 on the pulley 21 over which the belt 22 travels.

It will be apparent that, within tolerances of belt and pulley manufacturing, the several belts 22—22 of power transmission apparatus disclosed will maintain substantially constant alignment through all speed and power ratios.

The constant alignment feature of this invention as provided by the "driving" pulleys 21—21 in combination with the "driven" pulleys 23—23 is very important. It is to be recognized that a group of pulleys having the construction of pulleys 21—21 might possibly be used on both the driving and the driven shaft. But in such an arrangement, since the distance between the flanges on the one shaft is increasing and the distance between the flanges on the other shaft is decreasing during any speed change, the alignment of the center line of the belts with respect to the axes of the shafts would constantly change. In a like manner the alignment of the belts with respect to the axes of the shaft would change in a drive in which both shafts were provided with pulleys constructed in the manner of pulleys 23—23. In a power transmission in which the power transmitted is near maximum for the design capacity of the belts, misalignment of belts causes drastically shortened belt life. This is produced by uneven and increased belt wear on the sides of the belt. When the center distance between shafts is short and the drive is thus "close-coupled," misalignment angles are more acute and belt wear is increased critically. In the drive of this invention alignment is maintained irrespective of the shaft center distance.

In some circumstances it may be desirable to use other pulley flange actuator means than the fluid means previously disclosed in Figs. 2, 3, and 4. Referring to Figs. 5 and 6, apparatus is disclosed wherein flared pulley flanges are arranged and coupled in a manner similar to that of pulleys 21—21, in Fig. 2 but with mechanical actuator means. In Figs. 5 and 6, shafts 18a corresponds to driving shaft 18 shown in Figs. 1 and 2. There is shown in Fig. 5 a portion of a jack screw 45 and a nut 47 provided with a raised end 48. There is also provided a thrust bearing 158. Flange 39a is fixedly secured to shaft 18a by means of a resistance-welded joint 180. Instead of a resistance-welded joint 180, a brazed joint may be used or any other satisfactory means for attaching flange 39a to shaft 18a. The sliding flange 42a, abutting thrust bearing 158, is attached by means of resistance-welded joints 181—181, or brazing, to a plurality of splines 183—183, which slide in slots 184—184 on shaft 18a. As shown in Fig. 6, there are six of these slots and splines. Slots 184—184 extend to flange 39a. Also slidably positioned in these slots are splines 186—186. As shown in Fig. 6, there are six splines, which is preferred, but other numbers could be used. Secured to opposite ends of these splines 186—186 by resistance-welded joints 187—187 are opposed pulley flanges 189 and 190. One of belts 22a—22a is positioned between flange 42a and flange 189 and one of belts 22a—22a is positioned between flange 39a and flange 190.

In operation, movement of the nut 47 to the right will cause movement of flange 42a in the same direction. This will cause belt 22a, positioned between flanges 42a and 189, to move toward the outer periphery of the flanges. However, since the same belt tension will exist in either of belts 22a—22a and since flanges 189 and 190 are connected together by means of splines 186—186 this will also cause movement of flanges 189 and 190 toward the right with consequent movement of the other of belts 22a—22a positioned between flanges 190 and 39a toward the outer periphery of that pulley. The movement of flanges 189 and 190 will cease upon positioning of belts 22a—22a such that they are subjected to the same tension. Movement of nut 47 in an opposite or left-hand direction relative to the jack screw 45 permits a corresponding movement of flanges 42a, 189, and 190 in a left-hand direction.

Although the described arrangement of flanges and their coupling has been disclosed with particularity in a multibelt power transmission apparatus that is capable of variable speed ratios, the arrangement could be used in fixed ratio belt drives in order to obtain the benefit of the higher mechanical efficiency and the freedom from restrictions and cost of matched pulley flanges and matched belts. In such cases the flanges hitherto indicated as thrust flanges would be other fixed flanges or would be adjustable only to provide for desired belt tension. Otherwise, the flanges would be coupled and free to shift as previously described.

Additional advantageous features of this invention are to be found in the particular power transmission arrangement shown schematically in Fig. 8. In this embodiment, a driving shaft 318 driven by a suitable power source, not shown, rotatively supports a plurality of pulleys 321. The group of pulleys 321 comprises a fixed flange 339—339 at each of the opposite ends of the group, each having a front or conical face thereof turned inward or toward the center of the group. The flanges 339 are fixed to the shaft 318 by suitable means, represented schematically by the symbol X in Fig. 8. Centrally disposed in back-to-back relation is a pair of flared thrust flanges 342—342 adapted to be urged outward by equal forces as represented by the arrowheads at the base of flanges 342—342. The equal forces may be provided by conventional means, such as structural interconnection between the flanges, in a constant speed transmission, or cylinders mechanically connected to each flange actuated by external fluid means at constant equal pressure from the same line, in a variable speed transmission. A pair of fixedly interspaced back-to-back flared flanges 332 and 333 is axially slidably disposed on the shaft 318 between each pair comprising fixed flange 339 and thrust flange 342.

A pair of V belts 322—322 is provided between each pair of driving pulleys 321—321 and a pair of driven pulleys 323—323. Each pair of driven pulleys 323—323 is rotatably supported on a separate driven shaft 324 which is connected to a separate load, not shown.

The right-hand pair of pulleys 323—323, as seen in Fig. 8, is constructed similar to the left-hand pair of pulleys 323—323 but in object-to-mirror position. It will be seen that the following description relating to either pair of pulleys 323—323 applies with equal effect to the other pair 323—323, but with object-to-mirror reversal.

In each pair of driven pulleys 323—323, the second flange 336 from one end of the group is fixed to the shaft 324 by suitable means represented by the symbol X in Fig. 8. The second flange 326 from the opposite end of the group is adapted to slide axially on the shaft 324 and is adapted to be urged away from the fixed flange 336 by suitable means, not shown, but easily envisioned as similar to that shown in Fig. 2. In Fig. 8 the arrowheads at the bases of the flanges 326 symbolically indicate the direction of the forces urging the flanges 326 away from the flanges 336.

In each group of pulleys 323—323 is a pair of oppositely disposed flanges 396 and 398, which are fixedly interspaced with respect to each other but adapted to slide axially on the shaft 324, as symbolically shown by the line 393.

Before describing the operation of the embodiment shown in Fig. 8, consideration will be given to the nature and function of the forces urging the flanges 342 and 326 as represented by the arrowheads.

As in the previously described embodiments, changes in the amount of the forces of the thrust flanges 342 and 326 will affect the distance between the flanges which make up an individual pulley in any group, and thus, will change the speed and power ratio of the transmission unit. For any given load an increase in the force in the direction of the arrowheads on flanges 342 and a corresponding decrease in the force represented by the arrowheads on flanges 326 will produce an increase in the speed ratio of the drive unit. Converse changes in the forces will produce an opposite effect on the speed ratio of the drive. During any change in speed ratio, it will be apparent that in the embodiment of Fig. 8, as in previously described embodiments, the belts 322 will maintain substantially constant alignment and that the belts will be substantially parallel in all speed ratios. In addition, it will be apparent that the same transfer of forces from a belt 322 to another belt 322 and from a flange 342 to a flange 333 to a flange 339, and from a flange 326 to a flange 396 to a flange 398 to flange 336 will take place so that the belts 322—322 will operate under substantially equal tensions and will balance the loads between belts. Thus, all of the advantages of the previously described embodiments are to be found in the embodiment of Fig. 8.

During periods of operation when the forces urging the flanges 342 and 326 remain constant and the power transmission is operating at a constant speed ratio, the distance between the flanges of the pulleys 321—321 remains constant. Under such conditions of constant speed operation the flanges 342 are fixedly interspaced and slidable as a unit on the shaft 318.

An additional feature to be found in the operation of the embodiment of the invention shown in Fig. 8 is the attainment of a differential effect between the shafts 324—324. If during the operation of the power transmission the torque requirements of the shafts 324—324 become different, the various axially slidable flanges 332, 333, 396, and 398 move axially on the shafts 318 and 324—324 to positions which readjust the torque output of each of shafts 324—324. This readjustment varies the speed ratio between the right-hand group of pulleys 323 and 321, and the left-hand group of pulleys 323 and 321 to accomplish this result.

In many installations, such as on the rear drive wheels of automobiles, a differential drive effect is necessary between each of the driven units when coupled to a single drive source. This invention is particularly advantageous when applied in the power transmission of an automobile or other vehicle, in that it provides proportional torque to the rear driving wheels, one rear wheel being driven by each of shafts 324—324. A single driving source, such as an internal combustion engine, may be connected to shaft 318.

When this unit is installed in an automobile, normally both driving wheels will run at the same speed and carry the same torque. However, on turning a corner, the outside wheel will run faster than the other. The action of tending to run faster reduces the torque of this wheel, reduces the power pull in the load side of the V belts and also reduces the sliding pulley flange thrust of the driver pulleys to this wheel. At the same time, the opposite is taking place with the inside driving wheel which tends to slow down. The net result of these effects is that two sliding flanges on one side of the driver shaft become unbalanced, with respect to those on the other side, in the matter of axial thrust. The flanges against the belts to the slower wheel are exerting greater axial thrust than the opposite flanges. Since the two sliding thrust flanges which are spaced by the fluid or screw jack between them are free to float on the shaft, the entire assembly of flanges moves axially until, once again, the forces are in equilibrium. At this stage the gear ratios to the two driving wheels are different in the exact proportions of the rotative speeds of the wheel, and the perfect differential effect is achieved.

This power transmission overcomes a disadvantage in many presently used differential gear arrangements. In most conventional units employing a planetary gear system, if the resistance to rotation of either driving wheel is reduced to zero, the opposite wheel receives no torque and fails to rotate. In such a situation, the vehicle cannot be driven as the one wheel spins and other wheel stands still. In the present invention, should the one wheel lose traction, the differential effect and the shift of the pulley flanges would operate to produce maximum torque on the opposite wheel at the lowest obtainable speed ratio in the particular design, which in most cases will be adequate to move the vehicle.

Another significant use of this invention is to be found in its application to vehicles having multiple drive, such as four-wheel-drive "off the road vehicles." A separate power transmission, such as that shown in Fig. 8, would be operatively connected to the front wheels, and a separate similar power transmission would be operatively connected to the rear wheels, with suitable fluid connections between the fluid chambers in the several driving and driven pulleys of the transmissions. Such an arrangement would provide torque distribution to each vehicle wheel in proportion to the requirements at that wheel.

It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts, may be substituted without departing from the spirit or scope of the invention herein disclosed.

What is claimed is:

1. In a multibelt power transmission apparatus, including a driving shaft and a driven shaft, a plurality of pulleys on each of said shafts, said pulleys on one of said shafts comprising a coaxial group of flared flanges including: a flange fixed to said one shaft; a thrust flange oppositely disposed to said fixed flange, rotationally fixed with respect to said one shaft, but axially slidable thereon, and adapted to be urged away from said fixed flange by an external means; at least one pair of fixedly interspaced oppositely disposed flanges free to slide axially on said one shaft, said fixed flange being the second flange from one end of said group of flanges, and said thrust flange being the second flange from the other end of said group of flanges; and an edge-active belt connecting each pulley on said one shaft with another pulley on said other shaft.

2. A multibelt power transmission apparatus according to claim 1 wherein said at least one pair of fixedly interspaced oppositely disposed flanges are rotationally fixed with respect to said one shaft although free to slide axially thereon.

3. In a multiple V-belt power transmission apparatus including a driving shaft and a driven shaft, a plurality of pulleys having oppositely disposed coaxial conical flanges on each of said shafts, and an edge-active belt connecting each pulley on one of said shafts with a pulley on the other of said shafts, said pulleys on one of said shafts comprising: a flange fixed to said shaft with the conical face thereof outwardly disposed relative to the center of said pulley group; a thrust flange having its conical face oppositely disposed to said fixed flange, rotationally fixed with relation to said one shaft but axially slidable thereon, and adapted to be urged away from said fixed flange by an external means; and at least one pair of fixedly interspaced flanges having their conical faces oppositely disposed, free to slide axially on said driven shaft, one flange of said at least one pair being opposite said fixed flange.

4. A multiple V-belt power transmission apparatus according to claim 3 wherein said at least one pair of fixedly interspaced oppositely disposed conical flanges are rotationally fixed with respect to said one shaft although free to slide axially thereon.

5. A multibelt power transmission apparatus including a driving shaft, a driven shaft, and a coaxial group of pulleys on each of said shafts, wherein said group of pulleys on one of said shafts comprises: a first flared flange fixed to said one shaft; a second flared thrust flange oppositely disposed to said first flange, rotationally fixed with respect to said one shaft, but axially slidable with respect thereto, and adapted to be urged toward said first flange by external means; at least one pair of fixedly interspaced oppositely disposed flared flanges, free to slide axially on said one shaft and positioned between said first and second flanges; and wherein said group of pulleys on the other of said shafts comprises: a third flared flange fixed to said other shaft; a fourth flared thrust flange oppositely disposed to said third fixed flange, rotationally fixed with respect to said other shaft but axially slidable with respect thereto, and adapted to be urged away from said third fixed flange by an external means; at least one pair of fixedly interspaced oppositely disposed flared flanges, free to slide axially on said other shaft; said third fixed flange being the second flange from one end of said group of pulleys on said other shaft, and said fourth thrust flange being the second flange from the other end of said group of pulleys; and an edge-active belt connecting each pulley on said one shaft with a pulley on the other of said shafts.

6. A multiple V-belt power transmission apparatus including a driving shaft, a driven shaft, and a plurality of pulleys on each of said shafts having a plurality of oppositely disposed coaxial conical flanges, wherein a group of said pulleys on one of said shafts comprises: a conical faced first flange fixed to said shaft; a conical faced second thrust flange disposed with the conical surface thereof opposite to the conical surface of said first flange, rotationally fixed with respect to said one shaft but axially slidable thereon and adapted to be urged toward said first flange by external means; at least one pair of fixedly interspaced conical faced flanges positioned between said first and second flanges having the conical surfaces thereof oppositely disposed, free to slide axially on said one shaft, and wherein a group of pulleys on the other of said shafts comprises: a conical faced third flange fixed to said other shaft; a conical faced fourth trust flange having its conical face oppositely disposed to the conical face of said third flange, rotationally fixed with respect to said other shaft but axially slidable thereon, and adapted to be urged away from said third flange by an external means; at least one pair of conical faced fixedly interspaced flanges having the conical surfaces thereof oppositely disposed, free to slide axially on said other shaft; said third fixed flange being the second flange from one end of said group of pulleys on said other shaft and said fourth thrust flange being the second flange from the other end of said group of pulleys on said other shaft; and a V belt disposed between each oppositely disposed pair of conical pulley flanges on said one shaft and between an oppositely disposed pair of conical pulley flanges on said other shaft, urging said flanges apart and spacing said flanges to provide equal tension in said belts and continuously parallel belt alignment at all speed ratios of said power transmission apparatus.

7. In a multibelt power transmission apparatus, including a driving shaft and a pair of driven shafts; a plurality of pulleys on said driving shaft comprising: at least two flared flanges fixed to said driving shaft, at least two pairs of oppositely disposed, fixedly interspaced flared flanges, free to slide axially on said driving shaft, and another pair of oppositely disposed flared thrust flanges axially slidable as an interconnected unit on said driving shaft; and a group of pulleys on each of said driven shafts, each group comprising: a flared flange fixed to its driven shaft, at least one pair of oppositely disposed fixedly interspaced flared flanges, free to slide axially on its driven shaft, a flared thrust flange axially slidable with respect to its driven shaft and adapted to be urged to a selected position by external means, said fixedly interspaced flanges cooperating, respectively, with the fixed flanges and the thrust flanges on their respective shafts to define pulleys, and a V-belt connecting each driving shaft pulley with a driven shaft pulley.

8. In a multibelt power transmission apparatus, including a driving shaft and a pair of driven shafts; a plurality of pulleys on said driving shaft comprising: at least two oppositely disposed flared flanges fixed to said driving shaft, positioned at each end of the group of flanges constituting said pulleys, at least two pairs of oppositely disposed, fixedly interspaced flared flanges free to slide axially on said driving shaft and having one flange of each pair opposite one of said fixed flanges, and another pair of oppositely disposed flared thrust flanges axially slidable as an interconnected unit on said driving shaft; one flange of said another pair being urged toward one of said fixed flanges by external means and the other of said another pair being urged toward the other of said fixed flanges by external means, said first and second external means acting equally; and a group of pulleys on each of said driven shafts, each such group comprising: a flared flange fixed to its driven shaft, at least one pair of oppositely disposed, fixedly interspaced flared flanges free to slide axially on its driven shaft, and a flared thrust flange axially slidable relative to its driven shaft and adapted to be urged away from said fixed flange on said driven shaft by external means, one flange of said at least one pair of fixedly interspaced flanges on each driven shaft being a flange of a pulley with said fixed flange on that driven shaft; and a plurality of belts disposed between opposite pulleys on said driving and driven shafts.

9. In a multibelt power transmission apparatus, including driving shaft means and driven shaft means, a plurality of pulleys combined on each of said shaft means, and an edge-active belt connecting each pulley on said driving shaft means with a pulley on said driven shaft means, said pulleys on one of said shaft means comprising a flared flange fixed with respect to said one shaft means, with the active surface thereof faced outward of the center of said combined pulleys; a flared thrust flange oppositely disposed to said fixed flange, rotationally fixed with respect to said one shaft means but axially slidable relative thereto, with the active surface thereof faced outward of the center of said combined pulleys, and urged away from said fixed flange by an external force-producing means and urged toward said fixed flange by said edge-active belt; and at least one pair of fixedly interspaced oppositely disposed flared flanges free to slide axially on said one shaft means, one flange of said at least one pair coacting with said fixed flange to define a pulley.

References Cited in the file of this patent

UNITED STATES PATENTS

| | | |
|---|---|---|
| 2,111,077 | Reeves | Mar. 15, 1938 |
| 2,299,921 | Myers | Oct. 27, 1942 |
| 2,342,941 | Johnson | Feb. 29, 1944 |
| 2,420,100 | Salsbury | May 6, 1947 |
| 2,503,462 | Wyzenbeek | Apr. 11, 1950 |

FOREIGN PATENTS

| | | |
|---|---|---|
| 630,350 | Great Britain | Oct. 11, 1949 |